United States Patent [19]

Turner

[11] Patent Number: 4,637,161

[45] Date of Patent: Jan. 20, 1987

[54] APPARATUS FOR UNDERGROUND INSECT AND ANIMAL EXTERMINATION

[76] Inventor: Loren J. Turner, 2125 E. Roby Ave., Porterville, Calif. 93257

[21] Appl. No.: 750,494

[22] Filed: Jul. 1, 1985

[51] Int. Cl.[4] .................... A01M 1/20; A01M 19/00
[52] U.S. Cl. ........................................ 43/130; 43/132.1
[58] Field of Search ............... 43/130, 124, 132.1, 43/900, 138; 111/7.1, 6, 7

[56] References Cited

U.S. PATENT DOCUMENTS

| | | | |
|---|---|---|---|
| 162,716 | 4/1875 | Tongue | 43/130 |
| 992,140 | 5/1911 | Anderberg | 111/6 |
| 1,093,786 | 4/1914 | Korthauer | 111/7 |
| 1,991,930 | 2/1935 | Hope | 111/7.1 |
| 2,168,099 | 8/1939 | Hawkins | 43/130 |
| 2,336,522 | 12/1943 | Aiman | 111/7.1 |
| 3,753,408 | 8/1973 | Zimmerman | 111/7.1 |

Primary Examiner—Gene P. Crosby
Attorney, Agent, or Firm—Harvey B. Jacobson

[57] ABSTRACT

A tubular ground probe is provided for downward penetration into an underground habitat of insects or animals and the upper end of the probe is provided with inlet means for steam under pressure. A downwardly opening shield is provided on the lower portion of the probe and is slidable therealong and the shield includes a side vent for venting steams erupting from the ground within the confines of the shield downwardly and outwardly from peripheral portion of the shield.

14 Claims, 6 Drawing Figures

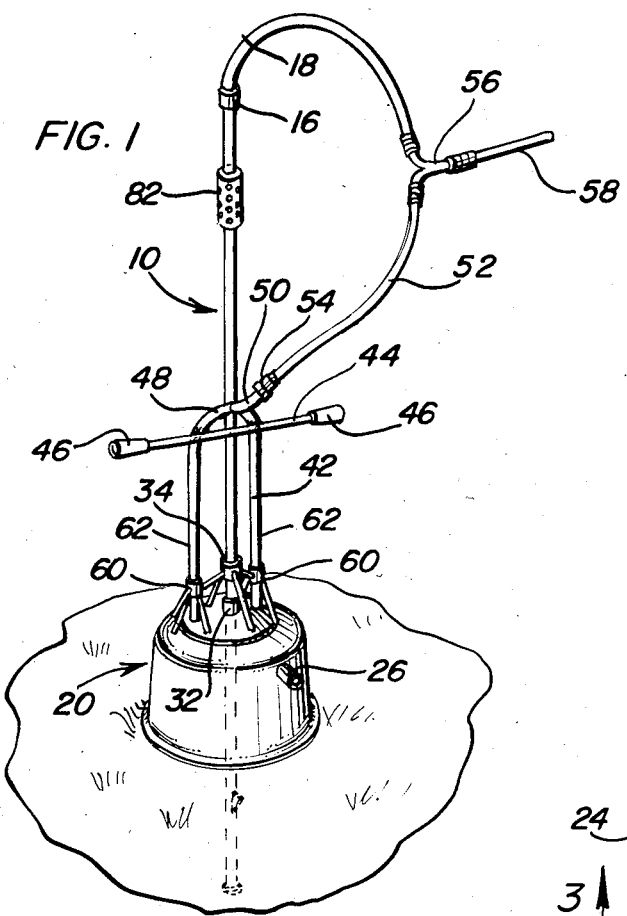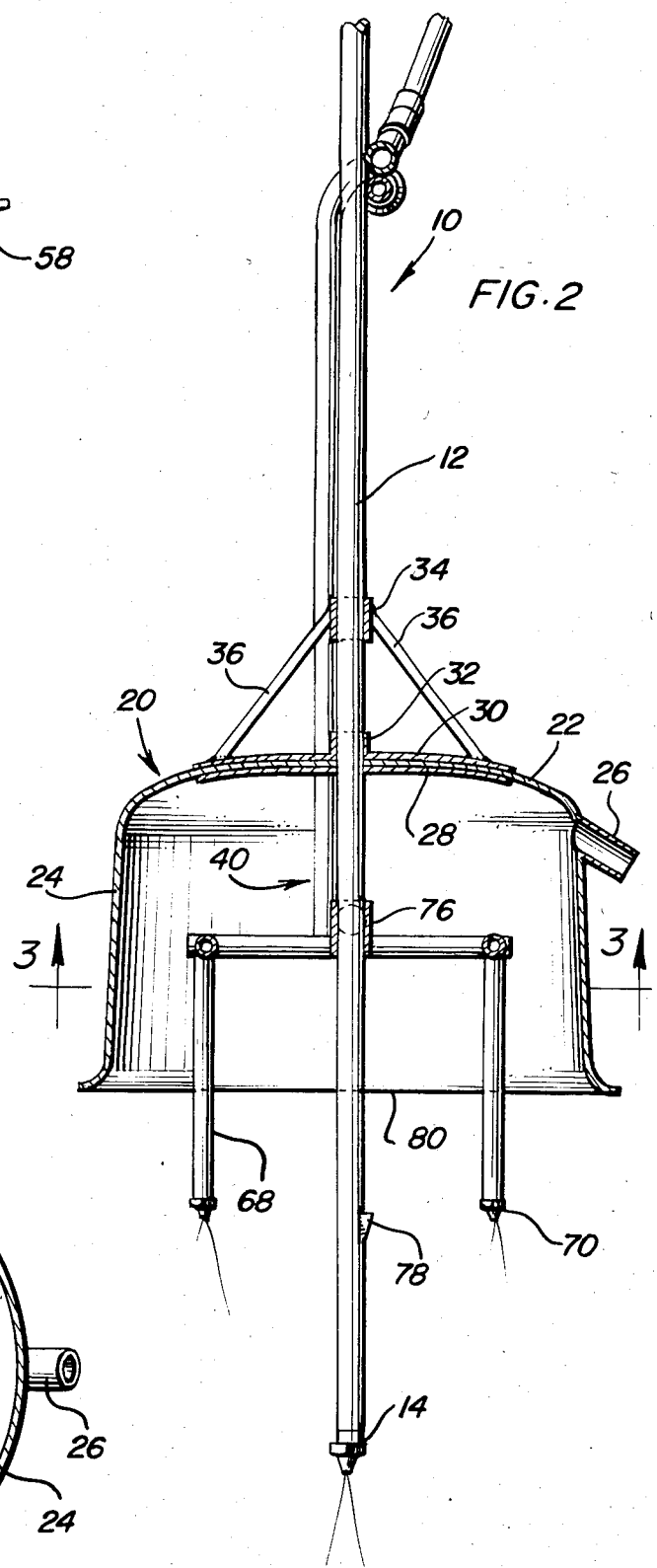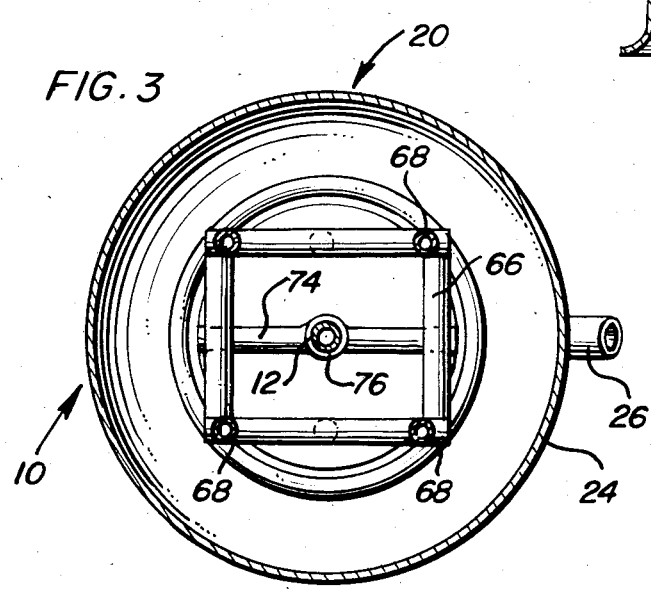

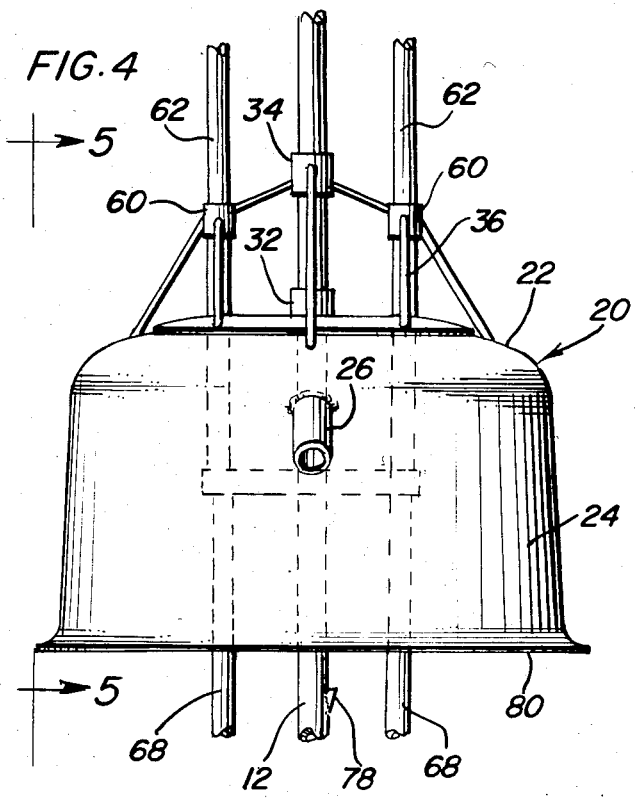
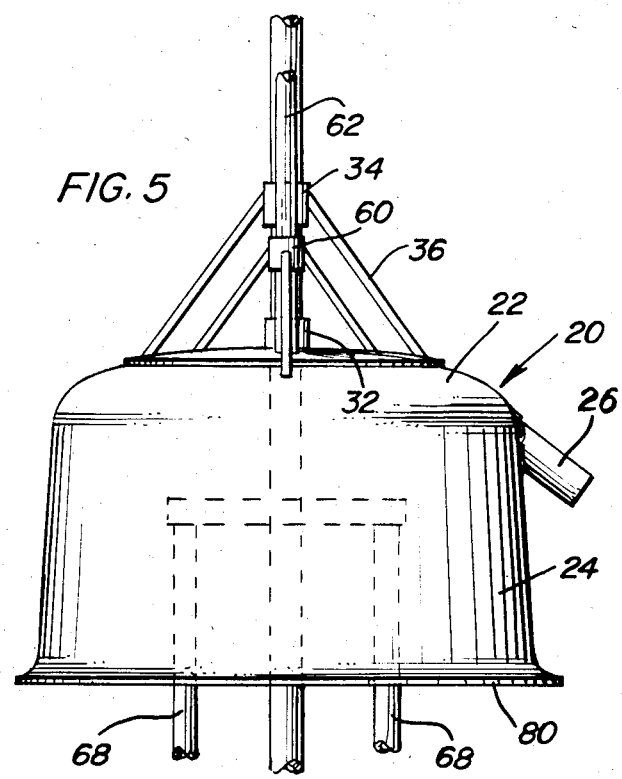
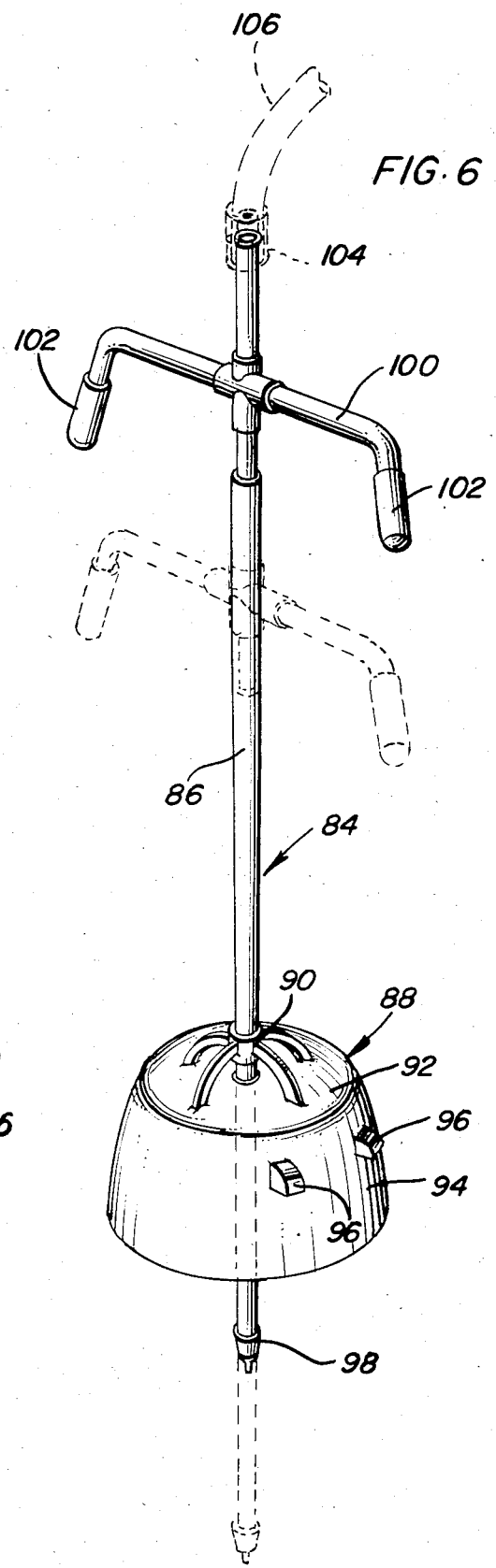

4,637,161

APPARATUS FOR UNDERGROUND INSECT AND ANIMAL EXTERMINATION

BACKGROUND OF THE INVENTION

1. Field of the Invention

This invention relates to a apparatus for downwardly injecting steam under pressure into the ground for the purpose of saturating the adjacent ground area with high temperature steam to exterminate underground insects and animals disposed in that area.

2. Description of Related Art

Various different forms of steam generating devices including steam discharge wands as well as spray wands for insect extermination and structures for underground injection of steam heretofore have been provided such as those devices disclosed in U.S. Pat. Nos. 801,460, 1,727,995, 2,117,419 and 2,168,099.

However, these previously known form of steam and spray injectors are not specifically designed for the purpose of insect and animal extermination in localized underground areas.

SUMMARY OF THE INVENTION

The apparatus of the instant invention incorporates an upstanding tubular ground probe to the upper end of which pressurized steam is supplied and the lower end portion of the probe is adapted for downward insertion into a localized underground area. Further, the probe includes a downwardly opening shield mounted thereon slidable along the probe and centrally downwardly through which the probe extends. The shield includes at least one outer peripheral downwardly opening vent for venting steam from beneath the shield and the shield functions to contain steam escaping from the ground about the probe.

The main object of this invention is to provide a method and apparatus by which underground insects and animals may be exterminated in localized underground areas.

Another object of this invention is to provide an apparatus for underground extermination of insects and animals and which is portable so that it may be readily transported from one area to another.

Still another important object of this invention is to provide an apparatus for underground steam injection constructed in a manner whereby steam may be injected into the ground simultaneously at different depths and throughout a plan area sufficient to encompass most localized underground insect and animal habitats.

Another important object of this invention is to provide an apparatus for underground steam injection an including shield structure operatively associated therewith for containing and harmlessly steam errupting from the surface of the ground about the ground area being injected with by steam.

A final object of this invention to be specifically ennumerated herein is to provide an apparatus for underground extermination of insects and animals and which will conform to convention forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of first form of apparatus contructed in accordance with the present invention;

FIG. 2 is a fragmentary enlarged longitudinal vertical sectional view of the lower portion of the apparatus illustrated in FIG. 1;

FIG. 3 a horizontal sectional view taken substantially upon the plane indicated by the section line 3—3 of FIG. 2;

FIG. 4 a fragmentary enlarged elevational view of the shield portion of the apparatus illustrated in FIGS. 1-3;

FIG. 5 is yet another elevational view of the shield portion of the apparatus as seen from the left side of FIG. 4; and FIG. 6 is a perspective view of a second form of apparatus constructed in accordance with the present invention.

DESCRIPTION OF THE PREFERRED EMBODIMENTS

Referring now more specifically to FIGS. 1-5 of the drawings, the numeral 10 generally designates the first form of apparatus for underground insect and animal extermination contructed in accordance with the present invention. The apparatus 10 includes an upstanding tubular ground probe 12 provided with an injection nozzle 14 on its lower end and including coupling structure 16 on its upper end to which the discharge end of a steam line 18 is readily removably coupled.

The ground probe 12 has a downwardly opening dome assembly referred to in general by the reference numeral slidably mounted thereon. The dome assembly 20 includes a top wall 22 and a depending outer peripheral wall 24. The upper portion of the outer peripheral wall 24 includes a downwardly and outwardly inclined vent neck 26 and the top wall 22 is internally and externally reinforced and as at 28 and 30 throughout the central portion thereof. The ground probe 12 is slidably received through a sleeve 32 carried by the reinforced central portion of the top wall 22 and additional sleeve 34 spaced above the sleeve 32 and braced relative to the reinforced central portion of the top wall 22 by inclined braces 36.

In addition to the ground probe 12, the apparatus 10 includes a secondary ground probe assembly referred to in general by the reference numeral 40 and including an tubular inverted U-shaped tube 42 across whose upper end a horizontal handle 44 is secured including opposite end hand grips. The curved upper bight portion 48 of the tube 42 includes an outwardly opening steam inlet neck 50 to which the discharge end of a second steam line 52 is readily removably connected by coupling structure 54 corresponding to the coupler structure 16. The inlet ends of the steam lines 18 and 52 are connected to a tubular Y-fitting 56 to which steam under pressure is supplied from the discharge end of a main steam supply line 58 extending from any suitable form of portable steam generator.

A pair of secondary guide sleeves 60 are supported and braced from the central portion of the top wall 22 in generally the same manner in which the sleeve 34 is mounted and the legs 62 of the tube 42 are slidably received through the sleeves 60 and the reinforced central portion of the top wall 22. The lower ends of the legs 62 open into opposite side portions of a generally square tubular manifold 66 and the four corner portion of the tubular manifold 66 include depending secondary tubular ground probes 68 on whose lower ends injection nozzles 70 similar to the injection nozzle 14 are carried. In addition, the tubular manifold 66 includes a cross-brace 74 provided with a central sleeve 76 slidably disposed on the ground probe 12. Further, the lower end portion of the ground probe 12 includes a wedge shaped abutment 78 against which the sleeve 76 in engagable to limit downward sliding movement of the tubular manifold 66 along the ground probe 12 and the underside of the central portion of the top wall 22 of the dome assembly 20 is engagable with the sleeve 76 to limit downward movement of the dome assembly 20 relative to the tubular manifold 66.

In operation, and when it is desired to exterminate fire ants in an underground ant hill, the apparatus 10 is positioned above the central portion of the ant hill and steam is supplied to the ground probe 12 and the secondary ground probes 68 through the lines 58, 18 and 52. The weight of the ground probe 12 is sufficient to cause it to penetrate the ground to a reasonable depth when steam is being discharged from the nozzle 14 and the handle 44 may be utilized to force the secondary ground probes 68 into the ground as steam is being discharged from the nozzles 70. The lower marginal edge 80 of the outer peripheral wall 24 of the dome assembly 20 rests upon the ground about the area thereof penetrated by the probes 12 and 68.

It is important to note that the apparatus 10 functions to inject high temperature steam into the ground under pressure at a point disposed below ground level and that the dome assembly 20 contains any erruptions of the ground about the area thereof penetrated by the probes 12 and 68 as a result of steam escaping from the ground. This contained steam is vented from the dome assembly 20 through the vent nozzel 26 in a downward and outward inclined direction. The ground probe 12 may be depressed to a level considerably below the lower ends of the probes 68 and the probes 68 may penetrate the ground to a depth equivalent to the length the probes 68 project below the tubular manifold 66.

It is to be further noted that even if the steam injected into the ground does not reach the lowest portion of the subterranean areas of the ant hill a considerable portion of the water content of the steam injected into the ground will condense in the form of heated water and the ground throughout a considerable area about those points of injection of steam into the ground will be saturated with very hot water. Accordingly, the extermination of fire ants is assured. Further, it is to be noted that the apparatus 10 also may be used for the extermination of underground animals. The ground probe 12 may be handled through the ultilization of a heat shielding handle 82 carried by an upper portion of the probe 12 and the outer end hand grips 46 of the handle 44 also insulate the user of the apparatus 10 against the high temperature of steam being passed through the ground probe 12 and the U-shapped tube 42.

With attention now invited more specifically to FIG. 6 of the drawings, there may be seen a second form of apparatus contructed in accordance with the present invention and referred to in general by the reference numeral 84. The apparatus 84 includes a single ground probe 86 corresponding to the ground probe 12 and a dome assembly referred to in general by the reference numeral 88 corresponding to the dome assembly 20. The dome assembly 88 is slidingly mounted on the ground probe 86 by a guide sleeve 90 coresponding to the sleeve 34 which is also braced relative top the central portion of the top wall 92 of the dome assembly 88 and the upper marginal portion of the outer peripheral wall 94 of the dome assembly 20 includes a pair of downwardly and outwardly opening steam vents 96 corresponding to the vent nozzle 26. Of course, the lower end of the ground probe 86 includes an injection nozzel 98 corresponding the the injection nozzle 14 and the upper end portion of the ground probe 86 includes and transverse handle 100 including opposite end hand grip 102. Further, the upper terminal end of the tubular ground probe 86 includes coupling structure 104 by which the discharge end of a steam supply line 106 corresponding the the supply line 58 may be readily removably coupled to the ground probe 86.

The operation of the apparatus 84 is substantially identical to the operation of the apparatus 10 except that the apparatus 84 includes only one ground probe.

The foregoing is considered as ilustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for exterminating underground insects and animals, said apparatus including an upstanding tubular ground probe, means at the upper end of said probe for attaching the outlet end of a pressurized steam supply hose thereto, a downwardly domed shield mounted on the lower of said probe for sliding movement therealong and with said probe extending centrally downwardly through said shield, said shield and probe including coacting means limiting downward movement of said shield along said probe, said shield including a downwardly opening vent outlet opening for venting steam from beneath said said shield, said vent outlet opening being spaced above the lower periphery of said shield.

2. The apparatus of claim 1 wherein the said downwardly and outwardly opening vent outlet includes a downwardly and outwardly inclined tubular vent neck secured through an upper portion of one side of said shield.

3. The apparatus of claim 1 wherein the upper end of said probe includes heat insulative hand grip means thereon 4. The apparatus of claim 3 wherein said handgrip means includes a horizontal transverse handle carried by said probe above said shield and including downturned opposite ends, and insulated hand grip elements mounted on said downtuned ends.

5. The apparatus of claim 1 wherein said shield includes a top wall, a guide sleeve mounted in spaced relation above said top wall and braced relative thereto, said probe being slidingly received through said guide sleeve and the center portion of said top wall.

6. The apparatus of claim 1 wherein said shield includes a top wall through the center portion of which said probe is slidingly received, an inverted U-shaped tube including a pair of depending tubular legs interconnected at their upper ends by a connecting tubular bight portion, said legs being slidably received downwardly through the top wall of said shield on opposite sides of said probe, the lower ends of said legs opening into opposite sides of an open frame manifold, said manifold including a central sleeve portion beneath said top wall through which said tubular probe is slidingly received, peripherally spaced portions of said manifold including downwardly projecting auxillery tubular probes, and means for admitting steam under pressure into said U-shaped tube.

7. The apparatus of claim 6 wherein said U-shaped tube includes handle means thereon disposed above said shield, said U-shaped tube and said shield including means establishing a limit of downward movement of said shield relative to said U-shaped tube.

8. The apparatus of claim 1 wherein the said shield includes a top wall, a guide sleeve mounted in spaced relation above said top wall and braced relative thereto, said probe being slidingly received through said guide sleeve and the center portion of said top wall, said downwardly and outwardly opening vent outlet including a downwardly and outwardly inclined tubular vent neck secured through an upper portion of one side of said shield.

9. The apparatus of claim 6 wherein said shield includes a guide sleeve mounted in spaced relation above said top wall and braced relative thereto, said probe being slidingly received through said guide sleeve as well as the center portion of said top wall.

10. The apparatus of claim 9 wherein said downwardly and outwardly opening vent outlet includes a downwardly and outwardly inclined tubular vent neck secured through an upper portion of one side of said shield.

11. The method of exterminating underground insects or animals including downwardly displacing the lower end portion of an upstanding tubular ground probe means into the ground and simultaneously supplying steam under pressure to the upper end portion of said probe, whereby the discharge of steam under pressure from the lower end of said probe will facilitate downward penetration thereof into the ground and effect below ground level injection of steam under pressure into the ground about the area thereof penetrated by the ground probe, providing a downwardly opening shield over the surface of the ground area centrally downwardly through which the ground probe penetrates and venting the interior of the shield to the exterior thereof in a downward and outward inclined direction through the shield from at least one side marginal portion thereof.

12. The method of claim 11 including the step of further downwardly penetrating the ground with said ground probe while maintaining said shield stationary relative to the ground surface.

13. The method of claim 12 including the step of injecting steam under pressure into the ground at points spaced about and above the lower end of said probe.

14. The method of exterminating underground insects and for animals, said method comprising ejecting steam under pressure into an underground habitat of insects or animals to a level approaching the lower limit of said habitat and in the central area of said underground habitat, injecting steam into the underground habitat at points spaced about and above said central area, and establishing a downwardly opening shield structure over the surface of the ground immediately above said central area and venting the interior of said shield structure to the ambient air in a downward and outward direction through the shield from at least one peripheral portion of said shield structure.

* * * * *